United States Patent
Bhesania et al.

(10) Patent No.: US 9,858,224 B2
(45) Date of Patent: Jan. 2, 2018

(54) UNIVERSAL SERIAL BUS EMULATION LAYER

(71) Applicant: Microsoft Technology Licensing, LLC, Redmond, WA (US)

(72) Inventors: Firdosh Bhesania, Kirkland, WA (US); Andrea A. Keating, Seattle, WA (US); Vivek Gupta, Bothell, WA (US); Robbie Harris, Woodinville, WA (US); Randall Aull, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 510 days.

(21) Appl. No.: 14/474,082

(22) Filed: Aug. 30, 2014

(65) Prior Publication Data

US 2016/0062932 A1    Mar. 3, 2016

(51) Int. Cl.
*G06F 13/38* (2006.01)
*G06F 13/42* (2006.01)
*G06F 9/44* (2006.01)

(52) U.S. Cl.
CPC .......... *G06F 13/382* (2013.01); *G06F 9/4413* (2013.01); *G06F 13/4221* (2013.01)

(58) Field of Classification Search
CPC .. G06F 13/4221; G06F 13/102; G06F 13/105; G06F 13/4282; G06F 9/4413
See application file for complete search history.

(56) References Cited

U.S. PATENT DOCUMENTS

| | | | |
|---|---|---|---|
| 6,081,856 A | 6/2000 | Comer | |
| 6,636,929 B1 | 10/2003 | Frantz et al. | |
| 6,968,307 B1 * | 11/2005 | Chrysanthakopoulos | G06F 13/105 703/24 |
| 7,213,096 B2 | 5/2007 | Keys et al | |
| 7,418,377 B2 | 8/2008 | Poley et al. | |
| 7,660,937 B2 | 2/2010 | Frantz et al. | |
| 7,752,029 B2 | 7/2010 | Tamayo et al. | |
| 8,095,623 B2 * | 1/2012 | Panabaker | G06F 13/105 709/219 |
| 8,200,853 B2 * | 6/2012 | Aull | G06F 9/544 710/62 |
| 8,261,002 B2 | 9/2012 | So et al. | |

(Continued)

FOREIGN PATENT DOCUMENTS

| | | |
|---|---|---|
| WO | 2011087929 A2 | 7/2011 |
| WO | 2012088293 A2 | 6/2012 |

OTHER PUBLICATIONS

"Fireface UCX", Retrieved at: <<http://www.rme-audio.de/en_products_fireface_ucx.php>>, Jan. 22, 2012, 7 Pages.

(Continued)

*Primary Examiner* — Brian Misiura

(74) *Attorney, Agent, or Firm* — Arent Fox LLP

(57) ABSTRACT

A universal serial bus stack may use an emulation layer to grant a non-universal serial bus device access to universal serial bus drivers and applications. The universal serial bus stack may exchange a device communication at an emulation layer. The universal serial bus stack may translate between a universal serial bus communication and the device communication at the emulation layer, and then may exchange the universal serial bus communication at a universal serial bus client interface.

17 Claims, 7 Drawing Sheets

(56) References Cited

U.S. PATENT DOCUMENTS

| | | | | |
|---|---|---|---|---|
| 8,294,821 | B1* | 10/2012 | Overby | H04N 5/4403 |
| | | | | 348/553 |
| 8,438,319 | B1 | 5/2013 | Edney | |
| 8,798,541 | B1* | 8/2014 | Scott | G06F 9/45545 |
| | | | | 455/41.2 |
| 2004/0122651 | A1 | 6/2004 | Herle | |
| 2007/0005867 | A1 | 1/2007 | Diamant | |
| 2007/0198244 | A1 | 8/2007 | King et al. | |
| 2013/0138860 | A1 | 5/2013 | Moore | |
| 2015/0356045 | A1* | 12/2015 | Soffer | G06F 13/4221 |
| | | | | 710/303 |
| 2016/0062942 | A1* | 3/2016 | Aiyar | G06F 13/385 |
| | | | | 710/106 |

OTHER PUBLICATIONS

"Enhanced Host Controller Interface Specification for Universal Serial Bus", Mar. 12, 2002, Retrieved at: <<http://www.intel.in/content/dam/www/public/us/en/documents/technical-specifications/ehci-specification-for-usb.pdf>>, Mar. 12, 2002, 155 Pages.

"VMware Workstation 4.5", Retrieved at: https://www.vmware.com/support/ws45/doc/devices_usb_ws.html>>, Jun. 19, 2004, 3 Pages.

"International Search Report & Written Opinion Received for PCT Application No. PCT/US2015/047308", dated Dec. 1, 2015, 11 Pages.

"International Preliminary Report on Patentability Issued in PCT Application No. PCT/US2015/047308", dated Oct. 13, 2016, 7 Pages.

* cited by examiner

*300*

*700*

UNIVERSAL SERIAL BUS EMULATION LAYER

BACKGROUND

Universal Serial Bus (USB) is a protocol for exchanging data and power between a peripheral device and a client device. A peripheral device is a separate device that may communicate with the client device. Examples of a peripheral device may include a mouse, keyboard, a printer, or other devices, both separated from and integrated with the client device. A universal serial bus port may allow the client device to communicate with the peripheral device or to transmit power to the peripheral device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to using an emulation layer in a universal serial bus stack to grant a non-universal serial bus device access to universal serial bus drivers and applications. The universal serial bus stack may exchange a device communication at an emulation layer. The universal serial bus stack may translate between a universal serial bus communication and the device communication at the emulation layer, and then may exchange the universal serial bus communication at a universal serial bus client interface.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Figure 1:
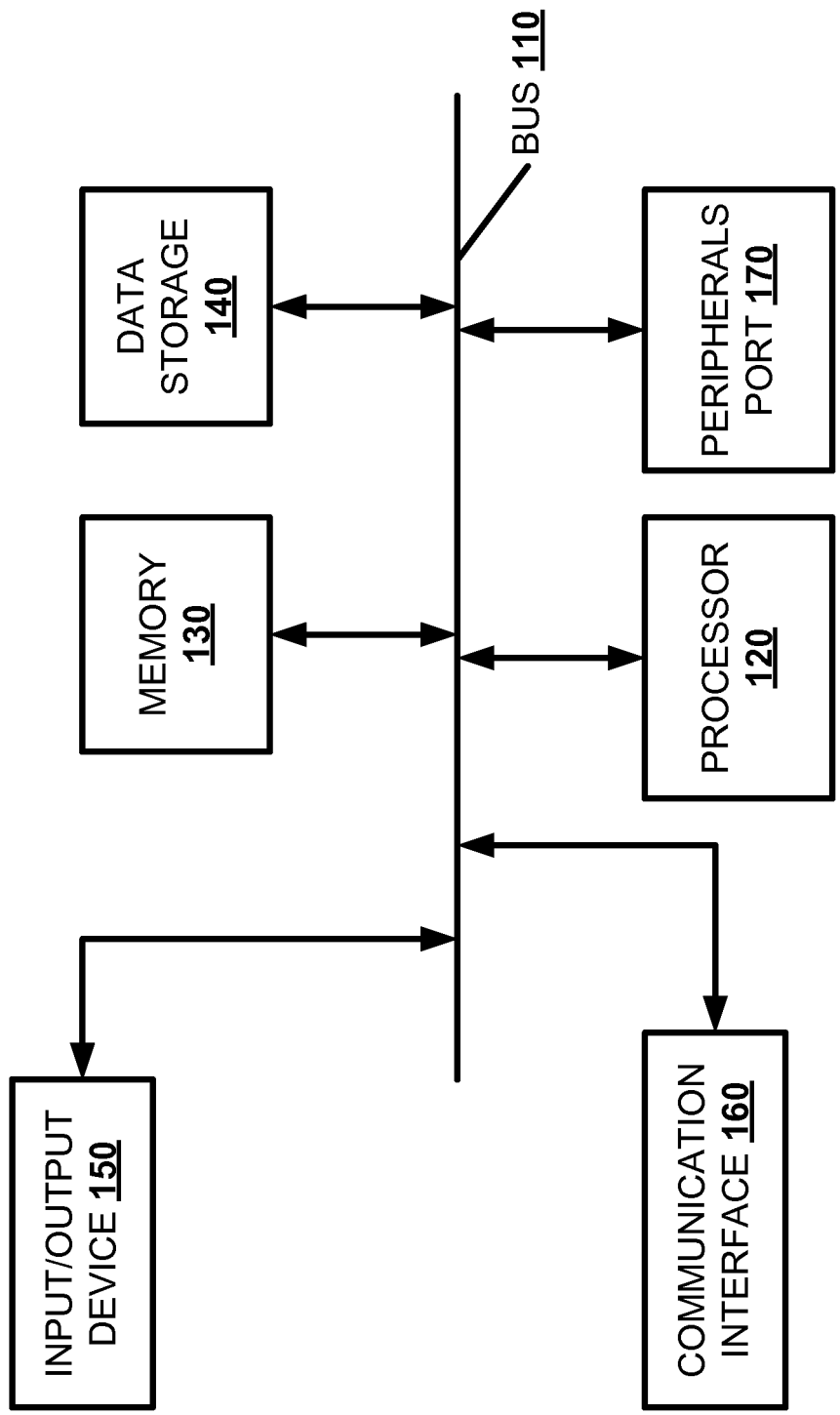
FIG. 1 illustrates, in a block diagram, an exemplary computing device.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a universal serial bus client device.

An operating system executed by a client device may support multiple universal serial bus class drivers to support both standardized and vendor proprietary universal serial bus classes. These class drivers may be fundamentally tied to universal serial bus devices, but new types of peripheral devices may emerge. Universal serial bus class drivers may be leveraged on top of non-traditional transport modalities.

For example, some new peripheral devices may be media agnostic. The peripheral device may communicate over a wireless communication medium, or any other type of communication medium. Additionally, some components that have traditionally been universal serial bus components have migrated to be on-chip components. An on-chip component is a component that is part of a system on a chip. A migrated universal serial bus component is a universal serial bus component that is now within the casing, often on-chip. Another type of internal component may be a virtual component. A virtual component is a component that has no physical manifestation, but rather is rendered in software to virtually perform functions. Further, device manufacturers and individuals, such as home hobbyists, may develop devices that do not completely conform to universal serial bus standards, rendering the devices as non-compliant universal serial bus components.

Each of these components may risk losing access to the class drivers and applications associated with the universal serial bus devices. Traditionally, a universal serial bus device accessed these drivers and applications via a universal serial bus stack. The universal serial bus stack may connect to the class drivers and applications through a universal serial bus client interface. By inserting an emulation layer in an extensibility point of the universal serial bus stack, the universal serial bus client interface may be opened up to a wider variety of components. The emulation layer may convert a device communication into a universal serial bus communication. Further, the emulation layer may autonomously respond to any communications by the operating system, other drivers, and applications. By filtering out these communications, a device specific driver may focus on basic communication with a device.

Thus, in one example, a universal serial bus stack may use an emulation layer to grant a non-universal serial bus device access to universal serial bus drivers and applications. The universal serial bus stack may exchange a device communication at an emulation layer. The universal serial bus stack may translate between a universal serial bus communication and the device communication at the emulation layer, and then may exchange the universal serial bus communication at a universal serial bus client interface.

FIG. 1 illustrates a block diagram of an exemplary computing device 100 which may act as a client device. The computing device 100 may combine one or more of hardware, software, firmware, and system-on-a-chip technology to implement a client device. The computing device 100 may include a bus 110, a processor 120, a memory 130, a data storage 140, an input/output device 150, a communication interface 160, and a peripherals port 170. The bus 110, or other component interconnection, may permit communication among the components of the computing device 100.

The processor 120 may be part of a processing system and include at least one conventional processor or microprocessor that interprets and executes a set of instructions. The memory 130 may be a random access memory (RAM) or another type of dynamic data storage that stores information and instructions for execution by the processor 120. The memory 130 also may store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions, such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that, when executed by one or more processors, cause the one or more processors to perform the method.

The input/output device 150 may include one or more conventional mechanisms that permit a user to input information to the computing device 100, such as a keyboard, a mouse, a voice recognition device, a microphone, a headset, a gesture recognition device, a touch screen, and the like. The input/output device 150 may include one or more conventional mechanisms that output information to the user, such as a display, a printer, one or more speakers, a headset, or a medium, such as a memory, or a magnetic or optical disk and a corresponding disk drive. The communication interface 160 may include any transceiver-like mechanism that enables computing device 100 to communicate with other devices or networks. The communication interface 160 may include a network interface or a transceiver interface. The communication interface 160 may be a wireless, wired, or optical interface. A peripherals port 170 may connect the client device to a peripheral device to allow the peripheral device to communicate with the client device.

The computing device 100 may perform such functions in response to the processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
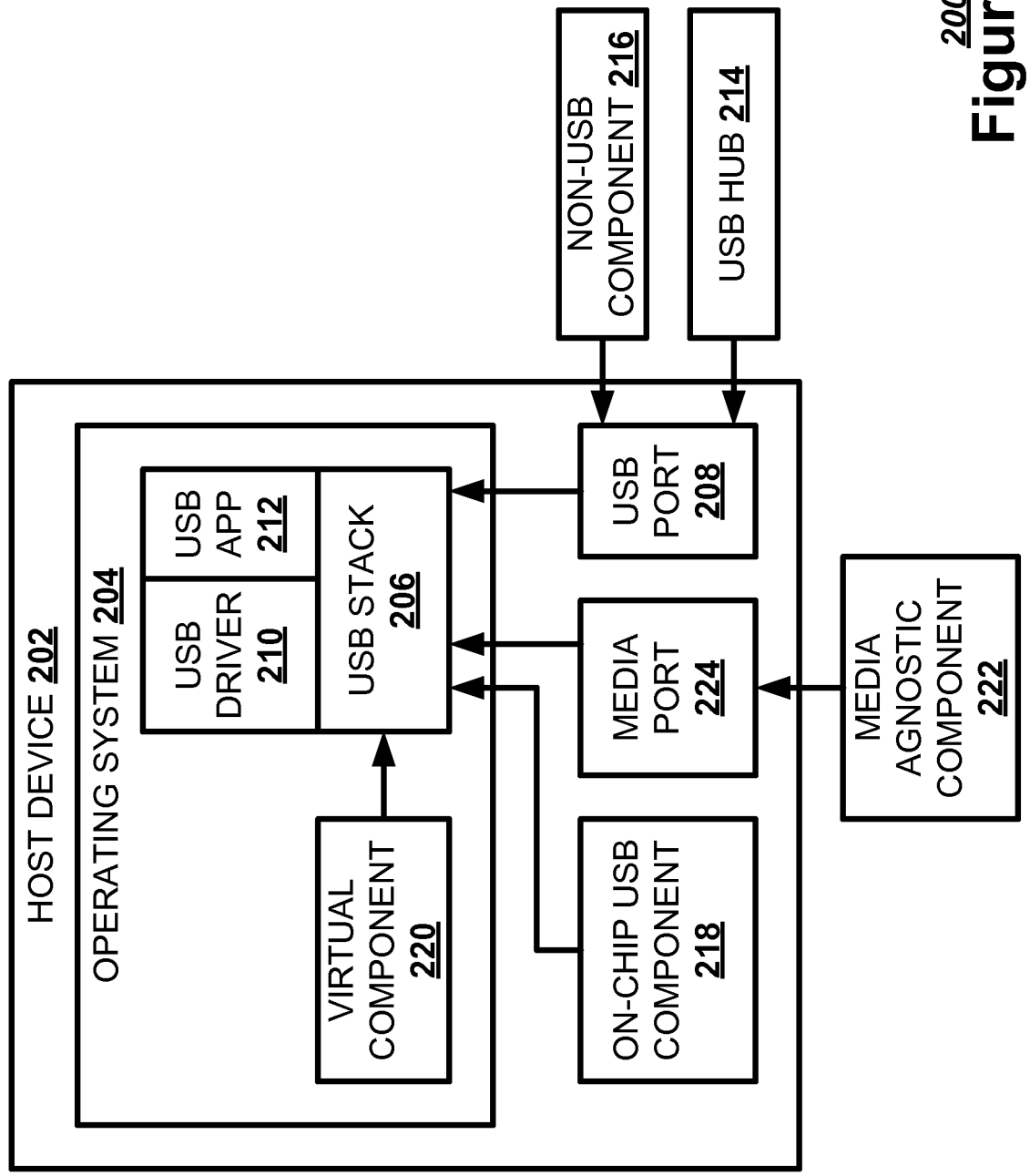
FIG. 2 illustrates, in a block diagram, an exemplary local network.

FIG. 2 illustrates, in a block diagram, an exemplary local network 200. A client device 202 may execute an operating system 204 that implements a universal serial bus stack 206 acting as a universal serial bus controller for handling peripheral devices attached to the client device 202. A user may plug a universal serial bus device into a universal serial bus port 208. A universal serial bus device is a peripheral device that conforms to the universal serial bus standard. The universal serial bus compliant device may send data to the universal serial bus stack 206 via the universal serial bus port 208. The universal serial bus stack 206 then may pass the transmitted data to a universal serial bus device driver 210 or a universal serial bus application 212. A universal serial bus device driver 210 provides access between the operating system 204 and the universal serial bus device. A universal serial bus application 212 is an application operating on the operating system 204 that may interact with the universal serial bus device. The universal serial bus port 208 may be connected to a universal serial bus hub 214. A universal serial bus hub 214 may allow multiple universal serial bus devices to use a single universal serial bus port 208

By inserting an emulation layer into the universal serial bus stack 206, a non-compliant universal serial bus component 216 still may access the universal serial bus device driver 210 or a universal serial bus application 212. The emulation layer may translate device communications to universal serial bus communications for consumption by the universal serial bus client interface. Additionally, the emulation layer may autonomously respond to any communications by the operating system, other drivers, and applications that a device driver may not normally receive. By filtering out these communications, a device specific driver may focus on basic communication with a device.

A non-compliant universal serial bus component 216 does not follow the universal serial bus standard. Further, the emulation layer may facilitate internal components to access the universal serial bus device driver 210 or the universal serial bus application 212 outside of the universal serial bus port 208. For example, the emulation layer may open the universal serial bus stack 206 to an on-chip universal serial bus component 218 or a virtual component 220. An on-chip universal serial bus component 218 is a component whose function used to be performed by a universal serial bus peripheral device, but is now performed by a system-on-a-chip component, such as a WiFi® or Bluetooth® transmitter. A virtual component 220 is a software simulation that performs a function of a peripheral device.

Additionally, the emulation layer may allow a media-agnostic universal serial bus component 222 to access the universal serial bus stack 206. The media-agnostic universal serial bus component 222 may connect to the client device 202 using any one of a variety of media, such as a universal serial bus cable, WiFi®, Bluetooth®, or other client device media. The media-agnostic universal serial bus component 222 may connect to the client device using a standard media port 224, such as a WiFi® or Bluetooth® transmitter.

Figure 3:
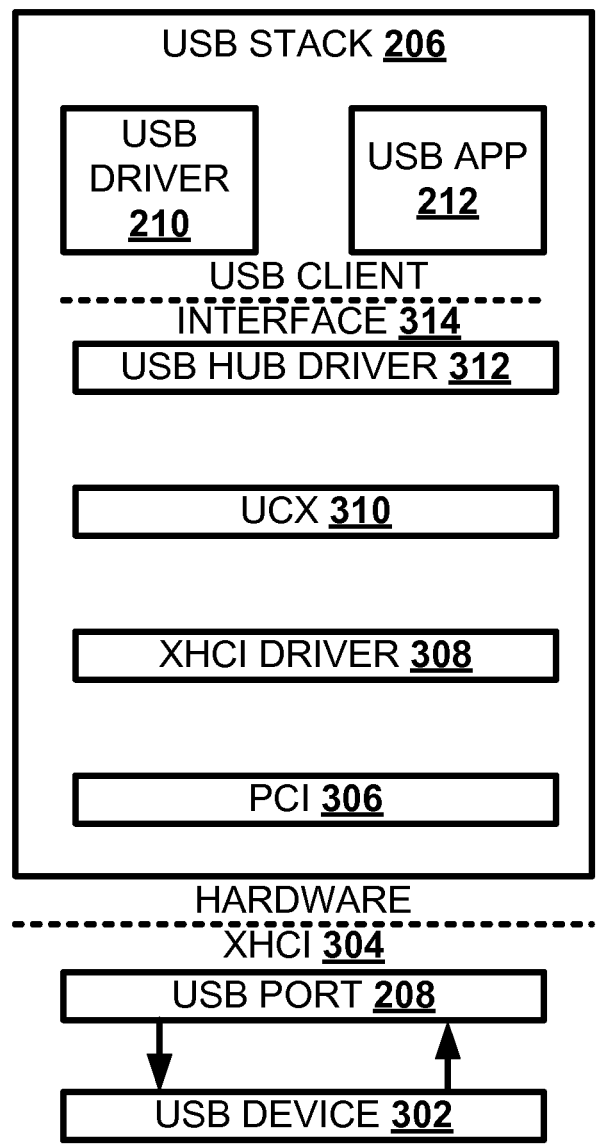
FIG. 3 illustrates, in a block diagram, an exemplary system architecture of a universal serial bus stack.

FIG. 3 illustrates, in a block diagram, an exemplary standard system architecture 300 of a universal serial bus stack, such as the universal serial bus stack 206. A universal serial bus device 302 may connect with a universal serial bus port, such as the universal serial bus port 208, to send a signal in a universal serial bus format, referred to herein as a universal serial bus communication. The universal serial bus port 208 may pass the universal serial bus communication via a hardware extensible host controller interface (xHCI) 304 to the universal serial bus stack 206.

The universal serial bus stack 206 may receive the universal serial bus communication in a peripheral component interface (PCI) 306 from the hardware extensible host controller interface 304. The peripheral component interface 306 may pass the universal serial bus communication to an extensible host controller interface driver 308 to register the universal serial bus device 302. The extensible host controller interface 308 may pass the universal serial bus communication to a universal serial bus class extension interface 310 to be forwarded to a universal serial bus hub driver 312. The universal serial bus class extension interface 310 may allow for future expansion of the universal serial bus stack 206. The universal serial bus hub driver 312 may facilitate communications between the universal serial bus device 302 and the universal serial bus device driver 210 or the universal serial bus application 212 at a universal serial bus client interface 314. The universal serial bus hub driver 312 may enumerate the universal serial bus device 302, thereby discovering the universal serial bus device 302 and configuring the universal serial bus device 302 for data transfer.

Figure 4:
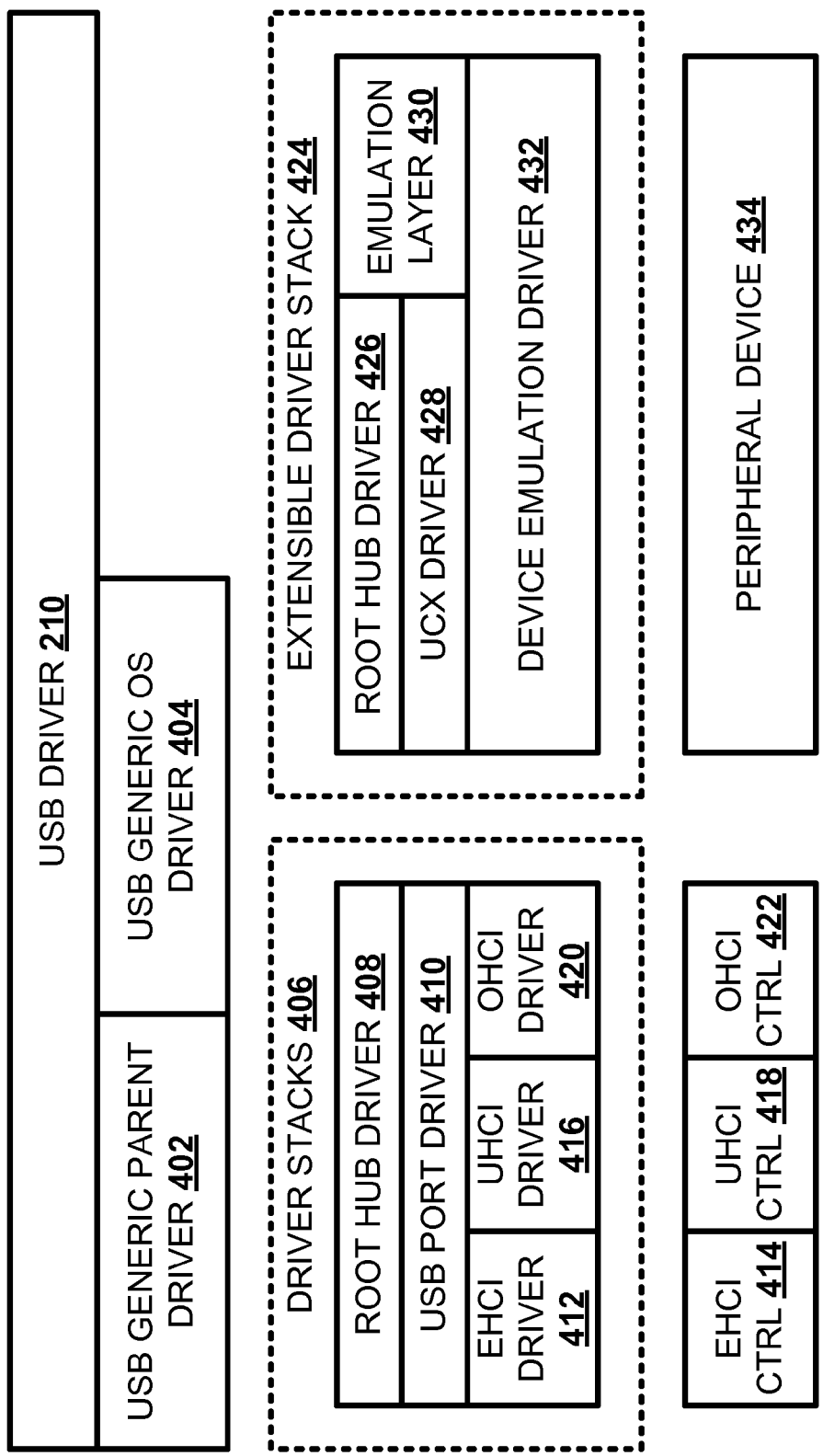
FIG. 4 illustrates, in a block diagram, an exemplary system architecture of an opened universal serial bus stack.

By inserting an emulation layer at the universal serial bus class extension interface 310, the universal serial bus stack 206 may handle peripheral devices beyond universal serial bus devices 302. FIG. 4 illustrates, in a block diagram, an exemplary expanded system architecture 400 of an opened universal bus stack, such as the universal serial bus stack 206. The universal serial bus drivers 210 may include numerous types of drivers, such as a universal serial bus generic operating system driver 402 or a universal serial bus generic parent driver 404. The universal serial bus generic operating system driver 402 may facilitate the interaction of the operating system 204 with the universal serial bus device 302. The universal serial bus generic parent driver 404 may facilitate interaction with the universal serial bus device 302, which exposes multiple universal serial bus interfaces to the client device 202.

The universal serial bus stack 206 may contain one or more driver stacks 406 having one or more drivers. The driver stack 406 may have a root hub driver 408 to execute universal serial bus device lifecycle management, enumeration of universal serial bus devices, discovery of universal serial bus devices, and other device tasks. The driver stack 406 may have a universal serial bus port driver 410 to facilitate the operating system 204 interacting with the hardware of the universal serial bus port 208. The driver stack 406 may have one or more host controller interfaces, each with a driver to facilitate communication and a controller (CTRL) to manage the interface. For example, an enhanced host controller interface (EHCI) may have an enhanced controller interface driver 412 and an enhanced host controller interface controller 414. An enhanced host controller interface may provide high speed functionality for the universal serial bus port 208. A universal host controller interface (UHCI) may have a universal controller interface driver 416 and a universal host controller interface controller 418. A universal host controller interface may provide low speed functionality for the universal serial bus port 208. An open host controller interface (OHCI) may have an open controller interface driver 420 and an open host controller interface controller 422. An open host controller interface provides low speed functionality for the universal serial bus port 208 with more intelligence moved into the controller in comparison to the universal host controller interface.

The universal serial bus stack 206 may use an extensible driver stack 424 to open up the universal serial bus stack 206 to other peripheral devices. The extensible driver stack 424 may have a root hub driver 426 to execute universal serial bus device lifecycle management, enumeration of universal serial bus devices, discovery of universal serial bus devices, and other device tasks. The extensible driver stack 424 may have a universal serial bus class extension interface 428 allowing an emulation layer 430 to be inserted into the extensible driver stack 424. A device specific emulation driver 432 may manage interactions between a peripheral device 434 and the extensible driver stack 424.

The emulation layer 430 may exchange a device communication with a device that does not strictly conform to the universal serial bus format, or that is not strictly a peripheral device. The emulation layer 430 may translate the device communication to emulate a universal serial bus communication for exchange with the universal serial bus client interface, by emulating universal serial bus behaviors to the client device 202 for the peripheral device. By emulating the universal serial bus communication, the non-compliant component may access the features available to the universal serial bus device 302. The emulation layer 430 may pass the emulated universal serial bus communication through the universal serial bus stack 206 to the universal serial bus client interface 314. The universal serial bus client interface 314 then may transmit the emulated universal serial bus communication to the universal serial bus device driver 210 or a universal serial bus application 212.

Figure 5:
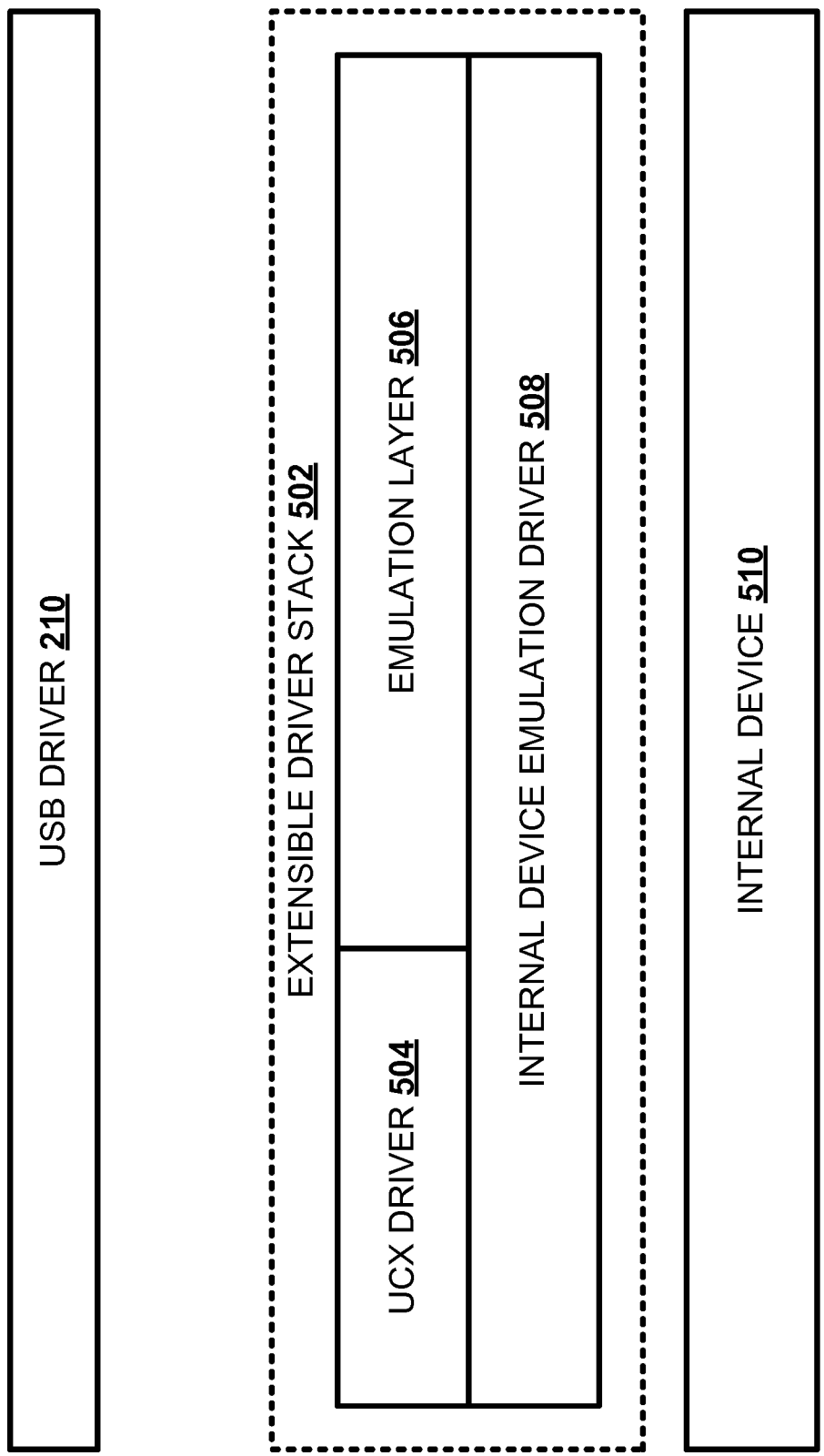
FIG. 5 illustrates, in a block diagram, an exemplary system architecture of internal universal serial bus stack.

While the emulation layer may work with a standard universal serial bus stack, such as the universal serial bus stack 206, the standard universal serial bus stack may be optimized for interacting with internal components, as opposed to external peripheral devices. FIG. 5 illustrates, in a block diagram, an exemplary system architecture of an internal universal serial bus stack 500. As with the expanded universal serial bus stack 206, the internal universal serial bus stack 500 may allow the internal components to interact with numerous different types of universal serial bus device drivers, such as the universal serial bus device driver 210. However, the processor of the client device may implement an extensible driver stack 502 optimized to reduce system overhead and processing time. The optimized extensible driver stack 502 may have a universal serial bus class extension interface 504 allowing an emulation layer 506 to be inserted into the optimized extensible driver stack 502. The optimized extensible driver stack 502 may forgo having a universal serial bus hub driver facilitating interactions between the operating system 204 and the extensible driver stack 502. An internal device emulation driver 508 may manage interactions between an internal device 510 and the optimized extensible driver stack 506.

However, the optimized extensible driver stack 502 may move much of the functionality of the root hub driver 426 to the emulation layer 506 and to the internal peripheral components themselves. The emulation layer 506 may execute a root hub operation, or an administrative action typically executed by the root hub driver 426. Further, the internal components may leverage their internal nature to execute a self-enumeration scheme, rather than having the root hub driver enumerate the component.

Figure 6:
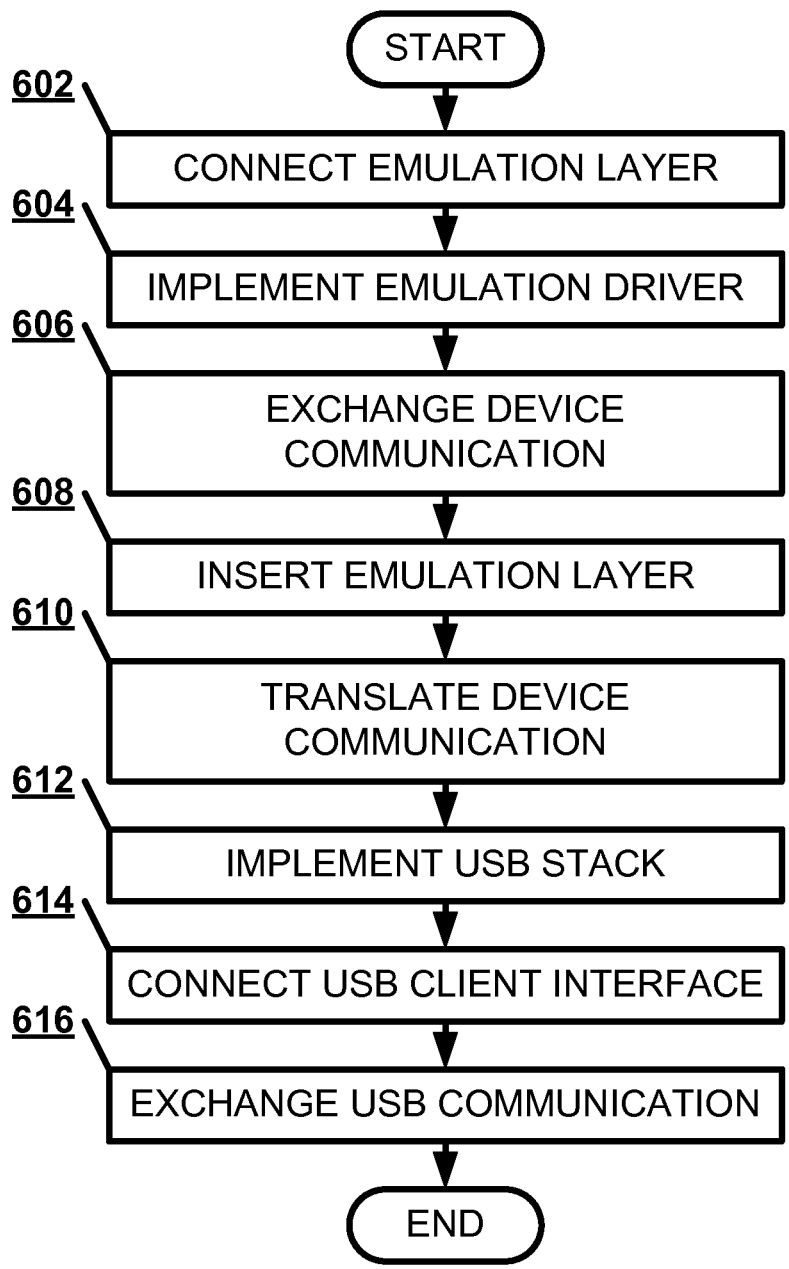
FIG. 6 illustrates, in a flowchart, an exemplary method for processing a peripheral component with a universal serial bus stack.

FIG. 6 illustrates, in a flowchart, an exemplary method 600 for processing a peripheral component by implementing a universal serial bus stack, such as the universal serial bus stack 206. A client device, such as the client device 202, may have a processor, such as the processor 120, configured to execute a universal serial bus stack 206, such as the universal serial bus stack 206, that connects an emulation layer, such as the emulation layer 430, with a device specific emulation driver, such as the device specific emulation driver 432 (Block 602). The universal serial bus stack may implement a device specific emulation driver to communicate with at least one of a virtual component, a media-agnostic universal serial bus component, a non-compliant universal serial bus component, and an on-chip universal serial bus component (Block 604). The universal serial bus stack may exchange a device communication at the emulation layer with a device specific driver (Block 606). The universal serial bus stack may insert the emulation layer as an extensibility point of a universal serial bus stack layer, such as a universal serial bus class extension interface (Block 608). The universal serial bus stack may translate between a universal serial bus communication and the device communication at the emulation layer (Block 610). The universal serial bus stack may transfer the universal serial bus communication between the emulation layer, such as the emulation layer 430, and a universal serial bus client interface, such as the universal serial bus client interface 314 (Block 612). The universal serial bus stack may connect the universal serial bus client interface with at least one of a universal serial bus device driver, such as the universal serial bus device driver 210, or a universal serial bus application, such as the universal serial bus application 212 (Block 614). The universal serial bus stack may exchange the universal serial bus communication at the universal serial bus client interface (Block 616). The universal serial bus stack may exchange communications in both directions, transferring a universal serial bus communication from the universal serial bus client interface to the emulation layer for translation to a device communication for a peripheral device, and vice versa.

Figure 7:
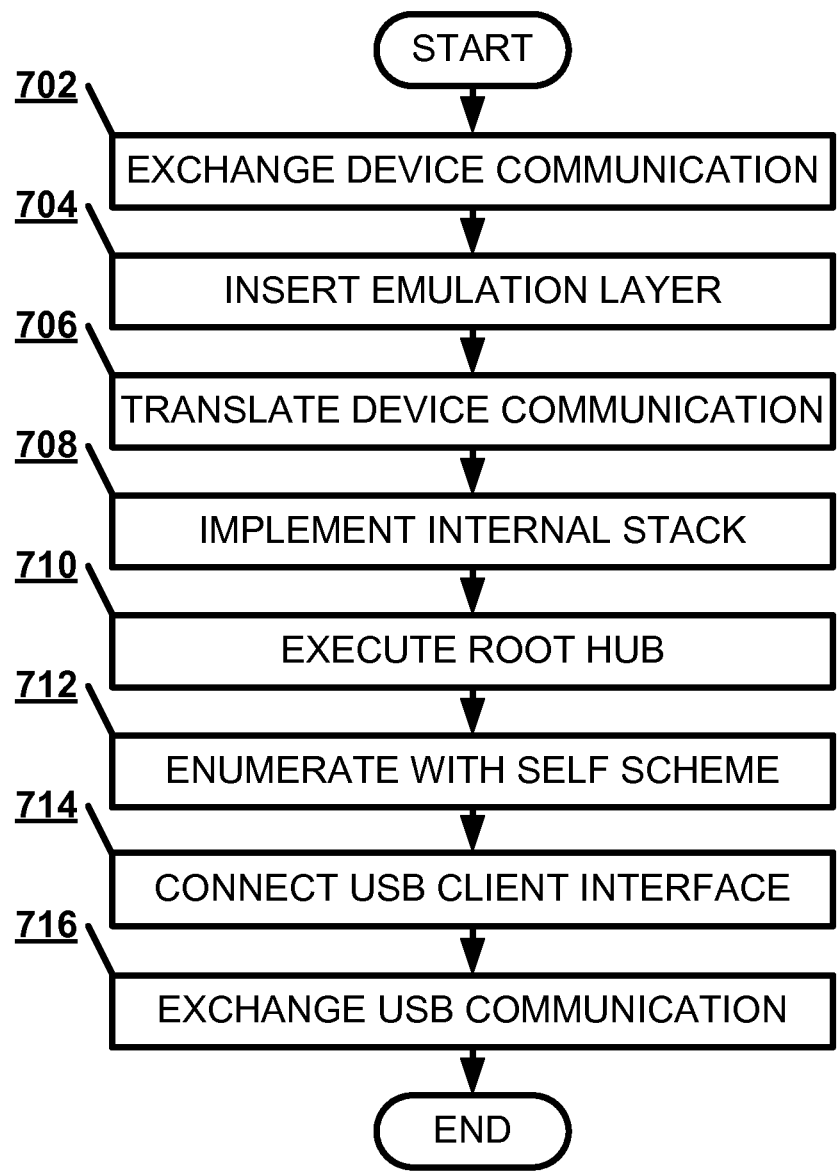
FIG. 7 illustrates, in a flowchart, an exemplary method for processing a peripheral component with an internal universal serial bus stack.

FIG. 7 illustrates, in a flowchart, an exemplary method 700 for processing a peripheral component by implementing an internal universal serial bus stack, such as the internal universal serial bus stack 500. A client device, such as the client device 202 may have a processor, such as the processor 120, that executes an internal universal serial bus stack, such as the internal universal serial bus stack 500, optimized for internal components that exchanges a device communication at an emulation layer, such as the emulation layer 430, with an internal component (Block 702). The internal universal serial bus stack may insert the emulation layer as an extensibility point of a universal serial bus stack layer, such as the universal serial bus class extension interface (Block 704). The internal universal serial bus stack may translate between a universal serial bus communication and the device communication at the emulation layer (Block 706). The internal universal serial bus stack may transfer the universal serial bus communication between the emulation layer, such as the emulation layer 506, and the universal serial bus client interface, such as the universal serial bus client interface 314 (Block 708). The internal universal serial bus stack may execute a root hub operation at the emulation layer (Block 710). The internal universal serial bus stack may enumerate the internal component following a self-enumeration scheme (Block 712). The internal universal serial bus stack may connect the universal serial bus client interface to at least one of a universal serial bus device driver, such as the universal serial bus device driver 210, or a universal serial bus application, such as the universal serial bus application 212 (Block 714). The internal universal serial bus stack may exchange the universal serial bus communication at the universal serial bus client interface (Block 716). The internal universal serial bus stack may also work in a reverse order, transferring a universal serial bus communication from the universal serial bus client interface to the emulation layer for translation to a device communication for an internal device, and vice versa.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention also may include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples also may be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   inserting an emulation layer that communicates with a universal serial bus stack layer via an extensible driver stack, wherein the emulation layer supports connection of a plurality of device specific emulation drivers;
   exchanging a device communication with at least one of the plurality of device specific emulation drivers at the emulation layer;
   translating between a universal serial bus communication and the device communication at the emulation layer;
   exchanging the universal serial bus communication at a universal serial bus client interface; and
   autonomously responding, at the emulation layer, to one or more communications received by an operating system via the universal serial bus client interface without exchanging another device communication with the at least one of the plurality of device specific emulation drivers.

2. The method of claim 1, further comprising:
   implementing a universal serial bus stack to exchange the universal serial bus communication between the emulation layer to the universal serial bus client interface.

3. The method of claim 1, further comprising:
connecting the emulation layer with at least one of the plurality of device specific emulation drivers.

4. The method of claim 1, further comprising:
implementing at least one of the plurality of device specific emulation drivers to communicate with at least one of a virtual component, a media-agnostic universal serial bus component, a non-compliant universal serial bus component, and an on-chip universal serial bus component.

5. The method of claim 1, further comprising:
implementing an internal universal serial bus stack for an internal component to transfer the universal serial bus communication between the emulation layer and the universal serial bus client interface, wherein the internal component is part of a system on a chip.

6. The method of claim 1, further comprising:
executing a root hub operation at the emulation layer to execute at least one of universal serial bus device lifecycle management, enumeration of universal serial bus devices, or discovery of universal serial bus devices.

7. The method of claim 1, further comprising:
enumerating an internal component following a self-enumeration scheme, wherein the internal component is part of a system on a chip.

8. The method of claim 1, further comprising:
connecting the universal serial bus client interface with at least one of a universal serial bus device driver and a universal serial bus application.

9. A non-transitory tangible machine-readable medium having a set of instructions stored thereon that when executed by a processing system having one or more processors cause the processing system to perform a method comprising:
inserting an emulation layer that communicates with a universal serial bus stack layer via an extensible driver stack, wherein the emulation layer supports connection of a plurality of device specific emulation drivers;
exchanging a device communication at the emulation layer with at least one of the plurality of device specific emulation drivers corresponding to an internal component, wherein the internal component is part of a system on a chip;
translating between a universal serial bus communication and the device communication at the emulation layer;
exchanging the universal serial bus communication at a universal serial bus client interface; and
autonomously responding, at the emulation layer, to one or more communications received by an operating system via the universal serial bus client interface without exchanging another device communication with the at least one of the plurality of device specific emulation drivers.

10. The non-transitory tangible machine-readable medium of claim 9, wherein the method further comprises:
using a universal serial bus stack to exchange the universal serial bus communication between the emulation layer and the universal serial bus client interface.

11. The non-transitory tangible machine-readable medium of claim 9, wherein the method further comprises:
implementing an internal universal serial bus stack for the internal component to transfer the universal serial bus communication between the emulation layer and the universal serial bus client interface.

12. The non-transitory tangible machine-readable medium of claim 9, wherein the method further comprises:
executing a root hub operation at the emulation layer to execute at least one of universal serial bus device lifecycle management, enumeration of universal serial bus devices, or discovery of universal serial bus devices.

13. The non-transitory tangible machine-readable medium of claim 9, wherein the method further comprises:
enumerating the internal component following a self-enumeration scheme.

14. The non-transitory tangible machine-readable medium of claim 9, wherein the method further comprises:
connecting the universal serial bus client interface with at least one of a universal serial bus device driver and a universal serial bus application.

15. A host device, comprising:
a peripheral device port configured to exchange a device communication with at least one of a plurality of device specific emulation drivers at an emulation layer; and
a processor configured to execute the emulation layer to:
insert the emulation layer that communicates with a universal serial bus stack layer via an extensible driver stack, wherein the emulation layer supports connection of the plurality of device specific emulation drivers;
translate between a universal serial bus communication and the device communication;
execute a universal serial bus stack that transfers the universal serial bus communication between a universal serial bus client interface and the emulation layer; and
autonomously respond, at the emulation layer, to one or more communications received by an operating system via the universal serial bus client interface without exchanging another device communication with the at least one of the plurality of device specific emulation drivers.

16. The host device of claim 15, wherein the universal serial bus client interface is connected with at least one of a universal serial bus device driver and a universal serial bus application.

17. The host device of claim 15, wherein the emulation layer is configured to execute a root hub operation to execute at least one of universal serial bus device lifecycle management, enumeration of universal serial bus devices, or discovery of universal serial bus devices.

\* \* \* \* \*